(12) United States Patent
Ehrlich (10) Patent No.: US 7,206,148 B2
(45) Date of Patent: Apr. 17, 2007

(54) VARIABLE FREQUENCY CHEVRON IN PRINTED MEDIA REFERENCE PATTERN TO IMPROVE SERVO DEMODULATION

(75) Inventor: Richard M. Ehrlich, Saratoga, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/081,346

(22) Filed: Mar. 16, 2005

(65) Prior Publication Data

US 2005/0157417 A1 Jul. 21, 2005

Related U.S. Application Data (63) Continuation-in-part of application No. 10/816,786, filed on Apr. 2, 2004, now Pat. No. 7,019,925.

(60) Provisional application No. 60/564,340, filed on Apr. 22, 2004, provisional application No. 60/460,205, filed on Apr. 2, 2003.

(51) Int. Cl.
*G11B 5/09* (2006.01)
(52) U.S. Cl. ........................................... 360/49
(58) Field of Classification Search ............ 360/75, 360/17, 48, 49, 50, 77.02, 78.04, 78.14
See application file for complete search history.

(56) References Cited

U.S. PATENT DOCUMENTS

| 5,107,378 | A | 4/1992 | Cronch |
| 5,966,264 | A | 10/1999 | Belser |
| 6,023,389 | A | 2/2000 | Cunningham |
| 6,025,970 | A | 2/2000 | Cheung |
| 6,411,459 | B1 | 6/2002 | Belser |
| 6,445,521 | B1 | 9/2002 | Schaff |
| 6,738,205 | B1* | 5/2004 | Moran et al. ................. 360/17 |
| 6,754,016 | B2* | 6/2004 | Messner et al. .............. 360/48 |
| 7,009,802 | B1* | 3/2006 | Ehrlich ........................ 360/75 |
| 2002/0135927 | A1 | 9/2002 | Yatsu |
| 2003/0161061 | A1 | 8/2003 | Lamberts |
| 2005/0128620 | A1* | 6/2005 | Ehrlich et al. ............... 360/48 |
| 2005/0128621 | A1* | 6/2005 | Ehrlich ........................ 360/48 |

(Continued)

FOREIGN PATENT DOCUMENTS

JP 63025803 2/1988

(Continued)

*Primary Examiner*—Fred F. Tzeng
(74) *Attorney, Agent, or Firm*—Fliesler Meyer LLP (57) ABSTRACT

Reference patterns in accordance with the present invention can include variable frequency chevrons incorporated into a reference pattern on a printed media surface to improve servo demodulation. In an embodiment, the reference pattern can include one or more servo wedges having a preamble including digital information at a first frequency relative to the head when the rotatable medium is rotated at a spin speed. The servo wedges further include at least one field having a first set of a plurality of phase-bursts forming a positive chevron angle relative to the preamble and a second set of a plurality of phase-bursts forming a negative chevron angle relative to the preamble, wherein a frequency of the at least one field relative to the head when the rotatable medium is rotated at the spin speed varies between a first end of the media surface and a second end.

19 Claims, 7 Drawing Sheets

U.S. PATENT DOCUMENTS

2005/0128629 A1* 6/2005 Ehrlich et al. ............... 360/75
2005/0280916 A1* 12/2005 Calfee et al. ............... 360/75
2006/0001999 A1* 1/2006 Ehrlich ....................... 360/75
2006/0007588 A1* 1/2006 Oki ............................ 360/75

FOREIGN PATENT DOCUMENTS

JP 6121184 4/1994
JP 10334402 12/1998

* cited by examiner

VARIABLE FREQUENCY CHEVRON IN PRINTED MEDIA REFERENCE PATTERN TO IMPROVE SERVO DEMODULATION

CLAIM OF PRIORITY

This application claims priority from U.S. Provisional Patent Application No. 60/564,340 entitled "Variable Frequency Chevron in Printed Media Reference Pattern to Improve Servo Demodulation" by Richard M. Ehrlich, filed Apr. 22, 2004, incorporated herein by reference. This application is also a continuation-in-part of U.S. patent application Ser. No. 10/816,786 entitled "Variable Frequency Chevron in Printed Media Reference Pattern to Improve Servo Demodulation" by Richard M. Ehrlich, filed Apr. 2, 2004 now U.S. Pat. No. 7,019,925, incorporated herein by reference, which claims priority to U.S. Provisional Patent Application No. 60/460,205 entitled "Variable Frequency Chevron in Printed Media Reference Pattern to Improve Servo Demodulation" by Richard M. Ehrlich, filed Apr. 2, 2003.

CROSS-REFERENCED CASES

The following applications and issued patents are cross-referenced and incorporated herein by reference:

U.S. patent application Ser. No. 10/733,131 entitled "Methods to Determine Gross and Fine Positioning on a Reference Surface of a Media," by Richard M. Ehrlich et al., filed Dec. 10, 2003.

U.S. patent application Ser. No. 10/818,174 entitled "Methods for Self-Servowriting Using Write-Current Variation," by Richard M. Ehrlich, filed Apr. 5, 2004.

U.S. patent application Ser. No. 10/818,175 entitled "Methods Using Extended Servo Patterns with Variable Servowriting and Self-Servowriting," by Richard M. Ehrlich, filed Apr. 5, 2004.

U.S. patent application Ser. No. 10/818,177 entitled "Methods for Variable Multi-Pass Servowriting and Self-Servowriting," by Richard M. Ehrlich, filed Apr. 5, 2004.

U.S. patent application Ser. No. 10/818,179 entitled "Methods Using Extended Servo Patterns with Variable Servowriting and Self-Servowriting," by Richard M. Ehrlich, filed Apr. 5, 2004.

U.S. patent application Ser. No. 10/818,180 entitled "Systems Using Extended Servo Patterns with Multi-Pass Servowriting and Self-Servowriting," by Richard M. Ehrlich, filed Apr. 5, 2004.

U.S. patent application Ser. No. 10/818,181 entitled "Systems for Multi-Pass Self-Servowriting," by Richard M. Ehrlich, filed Apr. 5, 2004.

U.S. patent application Ser. No. 10/818,185 entitled "Methods for Self-Servowriting With Multiple Passes Per Servowriting Step," by Richard M. Ehrlich, filed Apr. 5, 2004.

U.S. patent application Ser. No. 10/818,445 entitled "Systems Using Extended Servo Patterns with Variable Servowriting and Self-Servowriting," by Richard M. Ehrlich, filed Apr. 5, 2004.

U.S. patent application Ser. No. 10/818,446 entitled "Systems for Variable Multi-Pass Servowriting and Self-Servowriting," by Richard M. Ehrlich, filed Apr. 5, 2004.

U.S. patent application Ser. No. 10/818,450 entitled "Systems for Selective Multi-Pass Servowriting and Self-Servowriting," by Richard M. Ehrlich, filed Apr. 5, 2004.

U.S. patent application Ser. No. 10/818,473 entitled "Systems for Self-Servowriting Using Write-Current Variation," by Richard M. Ehrlich, filed Apr. 5, 2004.

U.S. patent application Ser. No. 10/818,704 entitled "Systems for Conditional Servowriting," by Richard M. Ehrlich, filed Apr. 6, 2004.

U.S. patent application Ser. No. 10/819,089 entitled "Systems for Conditional Servowriting," by Richard M. Ehrlich, filed Apr. 6, 2004.

U.S. Pat. No. 6,704,156 entitled "Self-Writing of Servo Patterns in a Disk Drive Using a Printed Reference Pattern," by Bill Baker, et al., issued Mar. 9, 2004.

U.S. Pat. No. 6,738,205 entitled "Self-Writing of Servo Patterns in Disk Drives," by Patrick Moran, et al., issued May 18, 2004.

FIELD OF THE INVENTION

The present invention relates to methods to servowrite media for use in data storage devices, and systems for applying such methods.

BACKGROUND

Advances in data storage technology have provided for ever-increasing storage capability in devices such as DVD-ROMs, optical drives, and disk drives. In hard disk drives, for example, the width of a written data track has decreased due in part to advances in read/write head technology, as well as in reading, writing, and positioning technologies. More narrow data tracks result in higher density drives, which is good for the consumer but creates new challenges for drive manufacturers. As the density of the data increases, the tolerance for error in the position of a drive component such as a read/write head decreases. As the position of such a head relative to a data track becomes more important, so too does the placement of information, such as servo data, that is used to determine the position of a head relative to a data track.

An embodiment of a rotatable disk for use in a data storage device in accordance with the present invention comprises an inner diameter, an outer diameter, and a servo wedge disposed between the inner diameter and the outer diameter. The servo wedge includes a first end, a second end, a preamble field extending from the first end to the second end, and a servo-burst field extending from the first end to the second end. The servo-burst field has a set of servo-bursts forming a chevron angle relative to the preamble field. A burst-frequency of the set of servo-bursts varies between the first end and the second end.

In another embodiment of a rotatable disk for use in a data storage device in accordance with the present invention, the servo-burst field includes two sets of servo-bursts—a first set of servo-bursts and a second set of servo bursts. A burst-frequency of one or both of the first and second sets of servo-bursts varies between the first end and the second end.

An embodiment of a system for use in a data storage device in accordance with the present invention comprises a reference disk including an inner diameter, an outer diameter, and a servo wedge disposed between the inner diameter and the outer diameter. The servo wedge includes a first end, a second end, a preamble field extending from the first end to the second end, and a servo-burst field extending from the first end to the second end. The servo-burst field includes one or more sets of servo-bursts forming a chevron angle relative to the preamble field. A burst-frequency of the set of servo-bursts varies between the first end and the second end. A circuit converts a signal of the servo wedge read by a read/write head so that the signal does not vary between the first end and the second end.

An embodiment of a method in accordance with the present invention comprises providing a reference pattern disposed between an inner diameter and an outer diameter of a disk, the reference pattern including a first end, a second end, and a servo wedge extending from the first end to the second end having a preamble field including digital information arranged circumferentially across the preamble field at a first frequency, and a servo-burst field including a set of servo-bursts arranged across the servo-burst field circumferentially at the first frequency from the first end to a transition region of the disk and arranged at a second frequency from a transition region to the second end. Digital information is sampled from the preamble field with a head. A preamble signal is obtained from the digital information samples from the preamble field. The preamble signal is filtered. The set of servo-bursts of the servo-burst field are sampled with the head. A servo-burst signal is obtained based on the first set of servo-burst samples from the servo-burst field. When the head is positioned between the first end and the transition region, the servo-burst signal is the set of servo-burst samples. When the head is positioned between the transition region and the outer second end, the servo-burst signal is obtained by converting the set of servo-burst samples from the second frequency to a third frequency, filtering the servo-burst samples, and converting the filtered set of servo-burst samples from the third frequency to the first frequency. The servo-burst signal is filtered.

BRIEF DESCRIPTION OF THE DRAWINGS

Further details of embodiments of the present invention are explained with the help of the attached drawings in which.

DETAILED DESCRIPTION

Figure 1:
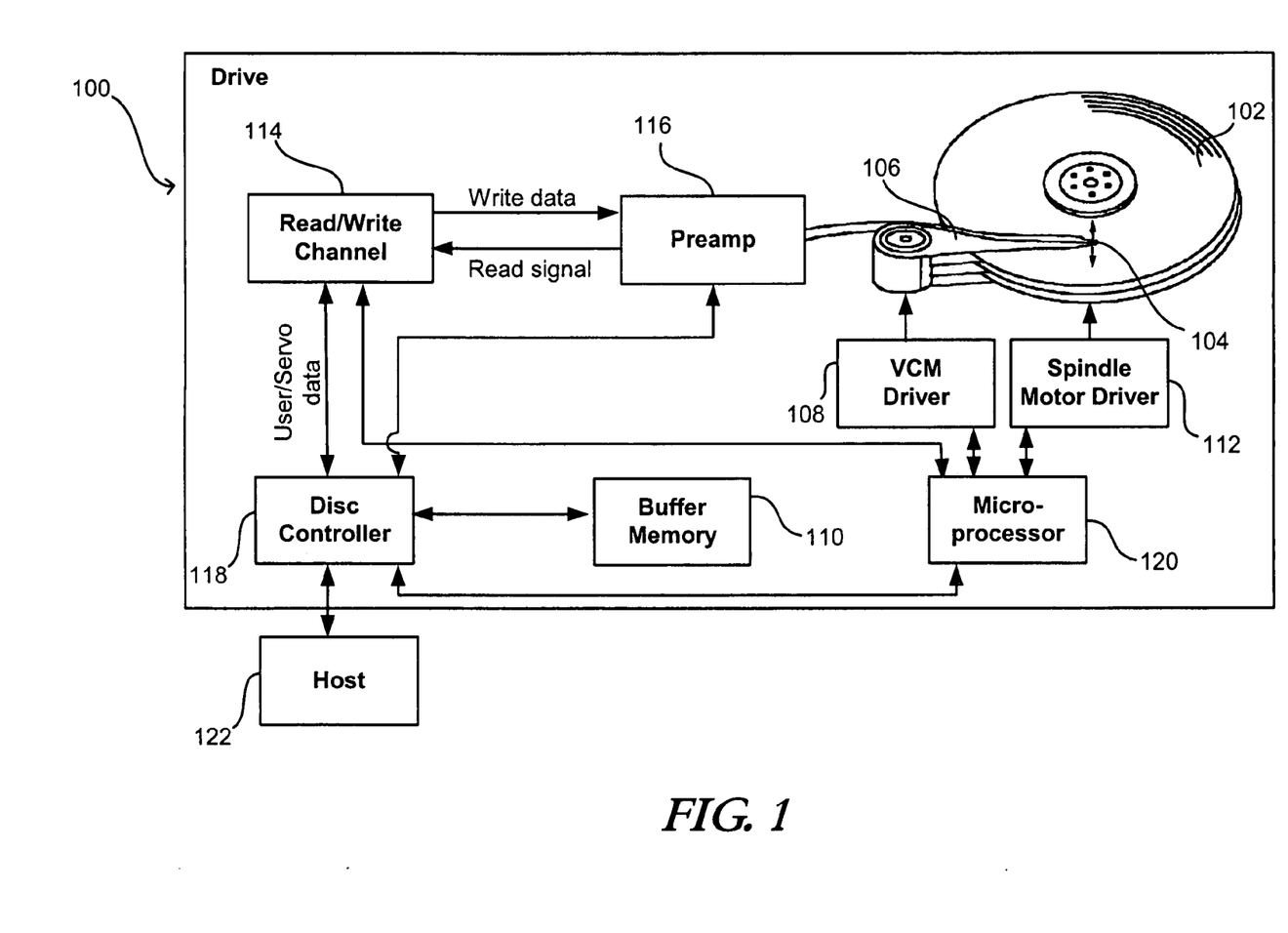
FIG. 1 is a control schematic of an exemplary hard disk drive that can be used with embodiments of methods in accordance with the present invention.

Systems and methods in accordance with embodiments of the present invention can be used when servowriting, or self-servowriting, a rotatable storage medium in a data storage device, such as a hard disk drive. A hard disk drive can include at least one magnetic disk capable of storing information transferred through a read/write head. FIG. 1 is a schematic of an exemplary hard disk drive 100 for use with embodiments of the invention including at least one magnetic disk 102 and a read/write head 104 capable of storing information on at least one of the surfaces of the disk. The read/write head 104 is positioned over the surface of the disk by a closed-loop servo system that can be used to pivot a rotary actuator on which the head 104 is mounted or formed. The servo system can comprise a microprocessor 120 and a servo controller, the servo controller existing as circuitry within the hard disk drive 100 or as an algorithm resident in the microprocessor 120, or as a combination thereof. In other embodiments, an independent servo controller can be used. The servo system uses positioning data read by the head 104 to determine the position of the head 104 over the disk 102. When the servo system receives a command to position a head 104 over a track, the servo system determines an appropriate current to drive through a voice coil (not shown) of the rotary actuator 106 and commands a voice coil motor (VCM) driver 108 electrically connected with the voice coil to drive the current. A magnetic field produced by the current driven through the voice coil interacts with stationary magnets of a VCM, causing the actuator 106 to pivot.

The servo system can further include a spindle motor driver 112 to drive current through a spindle motor connected with the disk 102, thereby rotating the disk 102, and a disk controller 128 for receiving information from a host 122 and for controlling multiple disk functions. The host 122 can be any device, apparatus, or system capable of utilizing the hard disk drive 100, such as a personal computer or Web server. An interface controller can be included for communicating with the host 122, or the interface controller can be included in the disk controller 128. In other embodiments, the servo controller, VCM driver 108, and spindle motor driver 112 can be integrated into a single application specific integrated circuit (ASIC). One of ordinary skill in the art can appreciate the different means for controlling the spindle motor and the VCM.

The disk controller 128 can provide user data to a read/write channel 114, which can send data signals to a current amplifier or preamp 116 to be written to the disk(s) 102. The disk controller 128 can receive servo and/or user data signals read by the read/write head 104 from the read/write channel 114. The disk controller 128 can also send servo signals to the microprocessor 120, or the disk controller 128 can control the VCM and spindle motor drivers directly. The disk controller 128 can include a memory controller (not shown) for interfacing with buffer memory 118. In an embodiment, the buffer memory 118 can be dynamic random access memory (DRAM). The microprocessor 120 can include integrated memory, or the microprocessor 120 can be electrically connected with external memory (for example, static random access memory (SRAM) 110 or alternatively DRAM).

Figure 2:
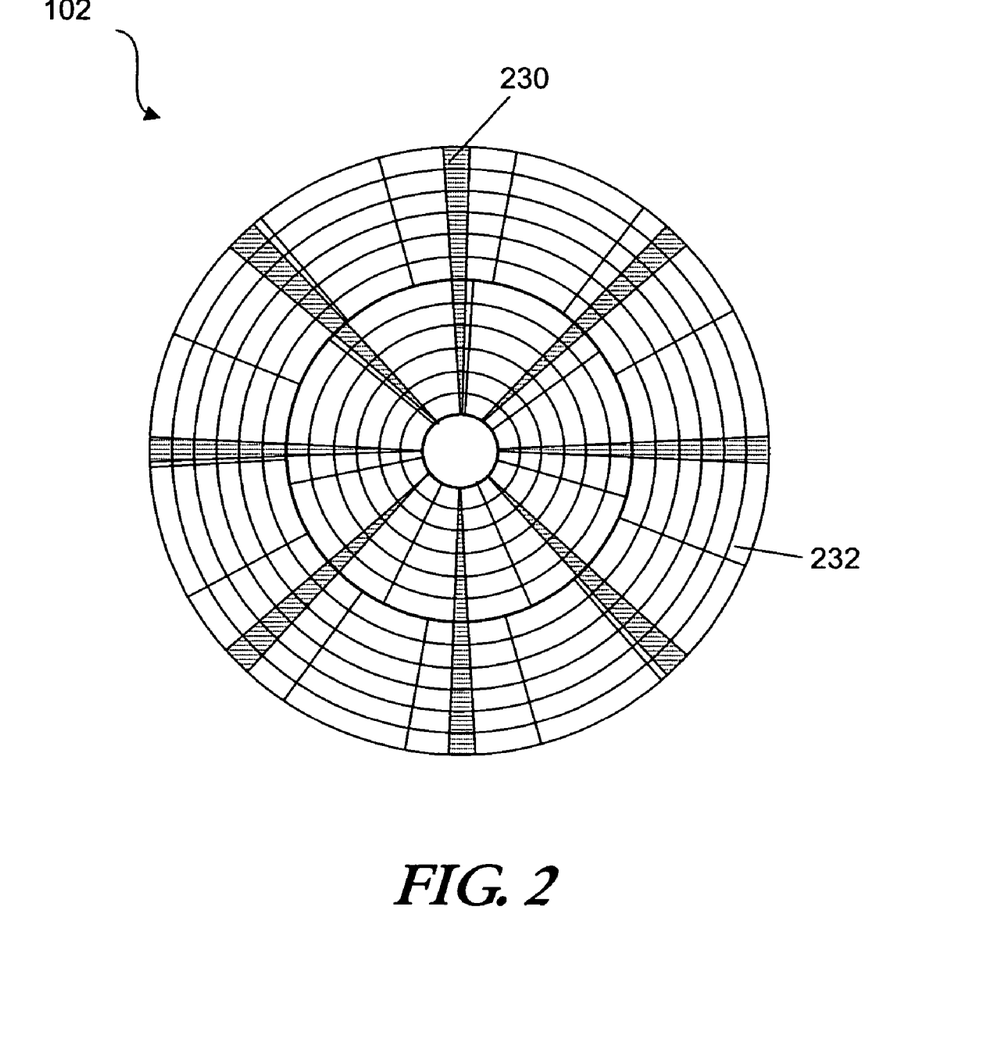
FIG. 2 is a disk for use in the hard disk drive of FIG. 1 having an exemplary data and servo format.

The information stored on such a disk can be written in concentric tracks, extending from near the inner diameter (ID) of the disk to near the outer diameter (OD) of the disk 102, as shown in the exemplary disk of FIG. 2. In an embedded servo-type system, servo information can be written in servo wedges 230, and can be recorded on tracks 232 that can also contain data. The servo wedges 230 are disposed between the ID and the OD, and can include an inner edge (also referred to herein as a first edge) preferably arranged approximately at the ID and an outer edge (also referred to herein as a second edge) preferably arranged approximately at the OD. Some small distance can exist between the inner edge of a servo wedge 230 and the ID, and the outer edge of the servo wedge 230 and the OD. (Note that the inner edge and the outer edge need not be located near the ID and the OD, respectively. In other embodiments the inner edge and outer edge can be as far or as close to the ID and OD as desired.) Data tracks written to the disk surface can be formatted in radial zones. Radial zones radiating outward from the ID can be written at progressively increased data frequencies to take advantage of an increase in linear velocity of the disk surface directly under a head in the respective radial zones. In a system where the actuator arm rotates about a pivot point such as a bearing, the servo wedges may not extend linearly from the inner edge to the outer edge, but may be curved slightly in order to adjust for the trajectory of the head as it sweeps across the disk.

Figure 3:
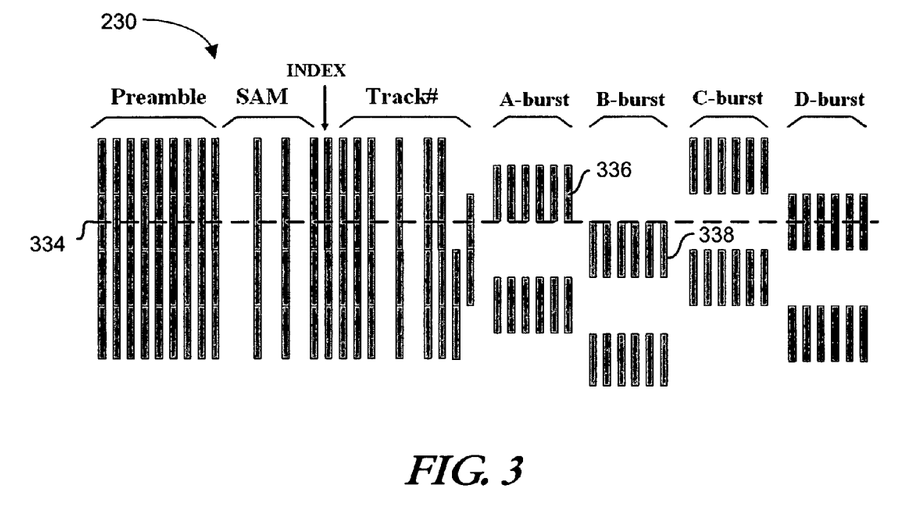
FIG. 3 is a portion of exemplary servo information written to a plurality of tracks.

FIG. 3 shows a portion of an exemplary final servo pattern within a servo wedge 230. The final servo pattern includes information stored as regions of magnetization. As shown in FIG. 3, where the at least one servo wedge 230 is longitudinally magnetized, gray blocks are magnetized to the left and white spaces are magnetized to the right, or vice-versa. Alternatively, where the at least one servo wedge 230 is perpendicularly magnetized, gray blocks are magnetized out of the page and white spaces are magnetized into the page, or vice-versa. In other embodiments, such as in optical data storage devices, information can be stored as indicia other than regions of magnetization. For example, the information can be stored as optical indicia. The final servo pattern is read by the head 104 as the surface of the spinning disk 102 passes under the head 104. The servo pattern can include information identifying a data field and a position of the head relative to the data field. The information can include, for example, a servo address mark (SAM), track identification information, an index, etc. The exemplary final servo pattern illustrated in FIG. 3 is a simplification of a typical servo pattern. The servo information can be arranged in any order, and can include many more transition pairs than are illustrated (for example, the region containing track identification is truncated as shown, and commonly includes many more transition pairs than are illustrated). Further, additional information, such as partial or complete wedge number information, can be included in the final servo pattern. One of ordinary skill in the art can appreciate the myriad different arrangements of information that can be contained in a servo pattern. Systems and method in accordance with embodiments of the present invention should not be construed as being limited in scope to those examples provided herein.

Servo information often includes bursts of transitions called "servo bursts." The servo information can be positioned regularly about each track, such that when a data head reads the servo information, a relative position of the head can be determined that can be used by a servo processor to adjust the position of the head relative to the track. For each servo wedge, this relative position can be determined, in one example, as a function of the target location, a track number read from the servo wedge, and the amplitudes or phases of the bursts, or a subset of those bursts. The position of a head or element, such as a read/write head or element, relative to the center of a target track, will be referred to herein as a position-error signal (PES).

A centerline 334 for a given data track can be "defined" relative to a series of bursts, burst edges, or burst boundaries, such as a burst boundary defined by the lower edge of A-burst 336 and the upper edge of B-burst 338 in FIG. 3. The centerline can also be defined by, or offset relative to, any function or combination of bursts or burst patterns. This can include, for example, a location at which the PES value is a maximum, a minimum, or a fraction or percentage thereof. Any location relative to a function of the bursts can be selected to define track position. For example, if a read head evenly straddles an A-burst and a B-burst, or portions thereof, then servo demodulation circuitry in communication with the head can produce equal amplitude measurements for the two bursts, as the portion of the signal coming from the A-burst above the centerline is approximately equal in amplitude to the portion coming from the B-burst below the centerline. The resulting computed PES can be zero if the radial location defined by the A-burst/B-burst (A/B) combination, or A/B boundary, is the center of a data track, or a track centerline. In such an embodiment, the radial location at which the PES value is zero can be referred to as a null-point. Null-points can be used in each servo wedge to define a relative position of a track. If the head is too far towards the outer diameter of the disk, or above the centerline in FIG. 3, then there will be a greater contribution from the A-burst that results in a more "negative" PES. Using the negative PES, the servo controller could direct the voice coil motor to move the head toward the inner diameter of the disk and closer to its desired position relative to the centerline. This can be done for each set of burst edges defining the shape of that track about the disk.

The PES scheme described above is one of many possible schemes for combining the track number read from a servo wedge and the phases or amplitudes of the servo bursts. For example, U.S. Pat. No. 5,381,281 to Shrinkle et al. describes a PES scheme including a quad-servo burst pattern in which the null-point is defined by a linear combination of the amplitudes of all four bursts, instead of simply the difference between two bursts as described immediately above. A quadrature-based track following algorithm applying a difference of sums of servo burst pair read voltages can minimize track following errors where servo bursts are mispositioned relative to one another. Such a scheme can benefit from embodiments of the present invention, as can many other track following schemes. One of ordinary skill in the art can appreciate the myriad different track following schemes for which embodiments of the present invention can be applied.

A disk drive can have tens of thousands of data tracks. A typical servo writing process can require, for example, 3.75 or more revolutions to complete steps for writing servo information for a data-track (for example, requiring a full revolution to write digital data and/or burst, as well as 0.25 revolution to seek to the next location for each of three servowriting-steps per data track). If such a process requires on average roughly 4 revolutions to write each data-track, with 100,000 data-tracks and a spin-speed of 5400 RPM (90 Hz), for example, the process of writing servo wedges on each surface would take 4,444 seconds, or about 74 minutes. If the process is carried out on an expensive servowriter, this can add substantially to the cost of the drive. Thus, drive manufacturers are motivated to use self-servowriting techniques to reduce or eliminate time spent servowriting data tracks using servowriters.

One such self-servowriting technique uses a media-writer to write servo patterns on a stack of disks. Each disk is then placed in a separate drive containing multiple blank disks. The drive can use the patterned disk as a reference to re-write servo patterns on all of the other disk surfaces in the drive, as well to write servo patterns on the reference surface, if desired. The media-writer can be an expensive instrument, and it may still take a very long time to write a reference pattern on the stack of disks. However, if a stack contains 10 blank disks, for example, then the media-writer can write the reference pattern for 10 drives in the time that it would have taken to servowrite a single drive. This scheme is a member of a class of self-servowriting techniques commonly known as "replication" self-servowriting.

Alternatively, a printed media disk can be placed in a drive containing multiple blank disks in substitution of (or in addition to) a media having a servo pattern written by a media-writer. Such a printed media disk can include a reference pattern transferred from a reticle or die. The reference pattern is a coarse pattern containing clocking and radial position information, providing a reference for writing final servo wedges on the disk surfaces. Printing a servo pattern on a media surface can reduce the time and expense required to write the servo pattern on the surface by transferring at least a portion of the reference pattern in one step or series of steps, rather than writing servo data on a track-by-track basis.

A magnetic printing station can be used to magnetically print or otherwise transfer the reference pattern using a known transfer technique. One such transfer technique is described in "Printed Media Technology for an Effective and Inexpensive Servo Track Writing of HDDs" by Ishida, et al. IEEE Transactions on Magnetics, Vol. 37, No. 4, Jul. 2001. A blank disk (the reference surface) is DC erased along the circumferential direction of the disk by rotating a permanent magnet block on the disk surface. A template, or "master", disk is then aligned with the blank disk and the two disks are securely faced with each other by evacuating the air between the two disk surfaces through a center hole in the blank disk. An external DC field is applied again in the same manner as in the DC erasing process, but with an opposite polarity. A similar process is described in U.S. Pat. No. 6,738,205, issued to Moran et al., incorporated herein by reference. Other techniques for transferring a reference pattern to a disk are well known, and are likewise applicable to embodiments of the present invention.

Figure 4:
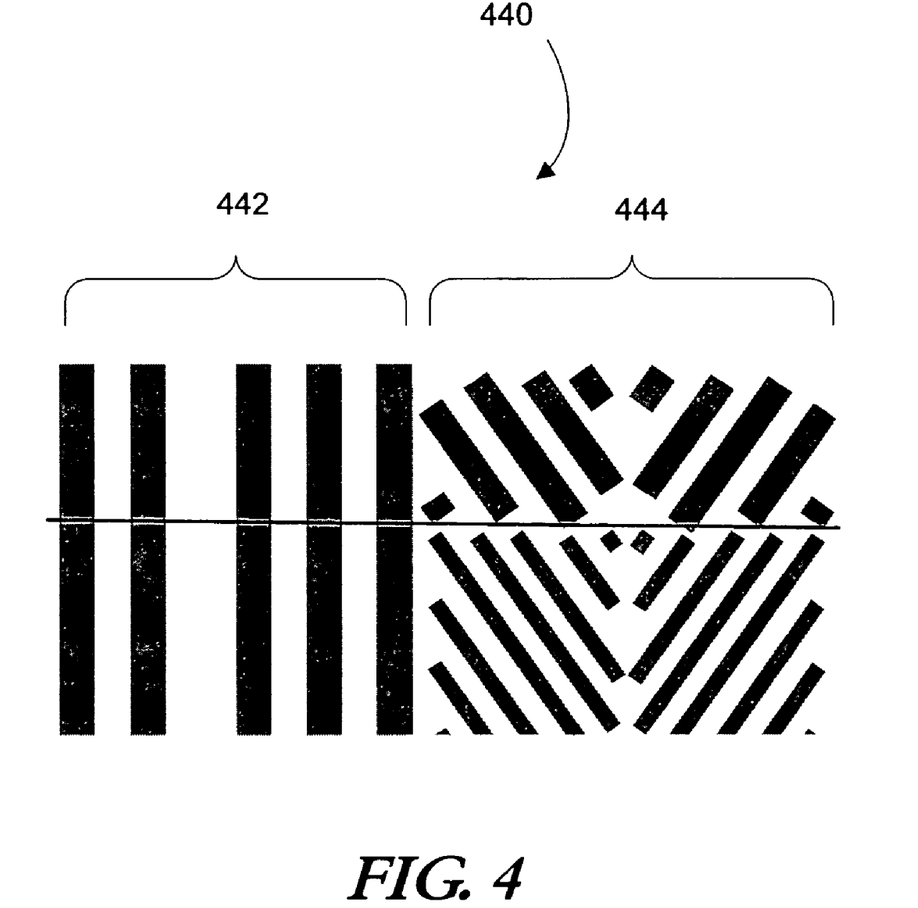
FIG. 4 is a portion of a reference pattern having a burst-region with variable frequency chevrons in accordance with an embodiment of the present invention.

Systems and methods in accordance with embodiments of the present invention can utilize variable frequency chevrons in a printed media reference pattern on a reference surface of a rotatable medium to improve servo demodulation. Although for simplicity a single printed media reference pattern will be described, it should be understood that there are many possible reference patterns that can utilize aspects of various embodiments of the present invention. In the exemplary reference pattern 440 shown partially in FIG. 4 and described herein, a preamble 442 (also referred to herein as a preamble region and a preamble field) includes a phase-lock-loop (PLL) and automatic gain control (AGC) region that can allow a drive system to lock up the PLL and AGC loops. The preamble as illustrated is truncated and simplified for purposes of explanation, and can include many more pairs of transitions. This region can be followed by a servo address mark (SAM). The time at which the SAM is encountered can give the demodulation circuitry a timing reference which can be used to accurately determine the location of the servo-bursts, to determine the time at which to begin looking for the next SAM, and to lock up a self-servo write (SSW) clock. In addition to the preamble and SAM regions, additional information can be included in a reference pattern. For example, the reference pattern can include an index-mark, or some other information identifying rotational position. In addition, the reference pattern can include information describing gross-radial position, such as a marker zone, as described in U.S. Pat. App. 10/733,131 entitled "Methods to Determine Gross and Fine Positioning on a Reference Surface of a Media". However, as shown in FIG. 4, following the SAM are servo-bursts 444. For printed media self-servo write (PM-SSW), the servo-bursts 444 in the reference pattern 440 can be pairs of oppositely-tilted chevrons, whose phase, relative to one another, can contain information about the radial position of a head, such as a read/write (R/W) head. (An example of once such scheme is described in U.S. Pat. No. 6,704,156 to Baker et al.)

In an exemplary servo-demodulation scheme, such as those known to one of ordinary skill in the art, a digital servo demodulation circuit can digitize samples of the signal from the R/W head at a rate of 4 times per cycle of the servo-burst signal. Performing a discrete Fourier transform (DFT) of the signal (useful in determining the phase and/or magnitude of the bursts) can then involve multiplying signals by either 0, +1, or −1. That is, the circuitry need only add, subtract, or ignore samples to compute the DFT of a signal. In the printed media servo demodulation, it could be necessary to use such a low sample frequency to sample at 4 times per cycle of the signal that the front-end analog circuitry would require larger capacitors than is practical in low-cost integrated circuits.

Embodiments of systems and methods in accordance with the present invention for applying printed media self-servowrite (specifically, serving on a printed-media pattern) allow the analog-to-digital converter (A/D) to sample many more than 4 times per cycle of the signal. For example, an A/D can sample a filtered signal at 20 times per cycle. After conversion, the channel can filter the signal with a hard-coded narrow band filter, centered at the expected burst-frequency. The channel can then digitally filter and down-sample the signal, such as to 4 samples per cycle, and can demodulate the burst using the "normal" DFT circuitry. Filtering or treatment of reference patterns of differing density using signal process techniques is known in the art.

Such embodiments can take advantage of a "20×" factor by "down sampling" a signal over the chevrons by a factor of 5, producing 4 samples per cycle. A DFT can then be performed for each of the chevrons. For a part of the stroke, such as near the ID of the reference surface in ID region, this pattern can be used. At some distance toward the OD, the burst-frequency can be switched to a frequency higher than the original frequency. For example, if the servo burst frequency used near the ID were 6 MHz (a 6 MHz cycle-rate for the signal, with the channel sampling at 20× the cycle-rate, or 120 MHz), then the reference pattern can switch to a 9 MHz burst-frequency at mid-stroke. If the frequency at or near the ID is limited to 6 MHz by the minimum allowable feature dimension, then near mid-stroke (where the radius of a track can be about 1.5 times the radius at the ID), a 9 MHz burst frequency can be supported. The preamble, SAM, and any other digital information can be maintained at the original 6 MHz rate, in at least certain systems and methods. Maintaining this information at the low frequency can allow the channel to lock up its PLL and detect the SAM using a single frequency independent of the location of the R/W head. Once the R/W head passes over the burst-region where the higher-frequency bursts should be encountered, the system can filter the signal differently, in order to down-sample by a different multiple. The different filtering and down-sampling would be designed to once again present the burst-demodulation circuitry with four samples per cycle of the down-sampled signal. It should be noted that in other embodiments, the A/D can sample at different rates. For example, the A/D can sample a filtered signal at 16 times per cycle.

For the example of a 1.5× frequency (relative to original burst cycle frequency), an interpolator circuit of the drive system can interpolate as follows. If the original stream of samples is denoted as $x_k$ (k is the index of the sample), 3 samples of $y_k$ can be produced for every 2 samples of $x_k$ received:

$$y_{3K} = 3 * x_{2K}$$

$$y_{(3K+1)} = x_{2K} + 2 * x_{(2K+1)}$$

$$y_{(3K+2)} = 2 * x_{(2K+1)} + x_{(2K+2)}$$

The resultant signal can then be passed through the same hard-coded band-pass filter used for the 6 MHz bursts, down-sampled, and a DFT taken as before.

In another embodiment of a system and method in accordance with the present invention, the hard-coded band-pass filter can be re-designed to deal with the 1.5× frequency signal as the "normal" frequency. Interpolation can be applied to make the reference pattern work with a burst-frequency that is only ⅔ of the new "normal" frequency. In such an embodiment, if the input signal is still denoted as $x_k$ and the output signal as $w_k$:

$$w_{2K} = 2 * x_{3K}$$

$$w_{(2K+1)} = x_{(3K+1)} + x_{(3K+2)}$$

This "down-sampled" signal processing can be used for the 6 MHz signal, and "normal" processing can be used for the 9 MHz signal. In the previous embodiment, "normal" signal processing can be used for the 6 MHz bursts, with "up-sampling" for the 9 Mhz bursts. In yet another embodiment, two separate down-samplers could be used, each designed for one down-sampling ratio. For the example discussed here, one down-sampler would deal with 6 MHz bursts, and the other would deal with 9 MHz bursts. In each case, the output of the down-sampler would be four signal samples per cycle of the respective bursts, allowing use of the standard burst-demodulation circuitry.

Figure 5A:
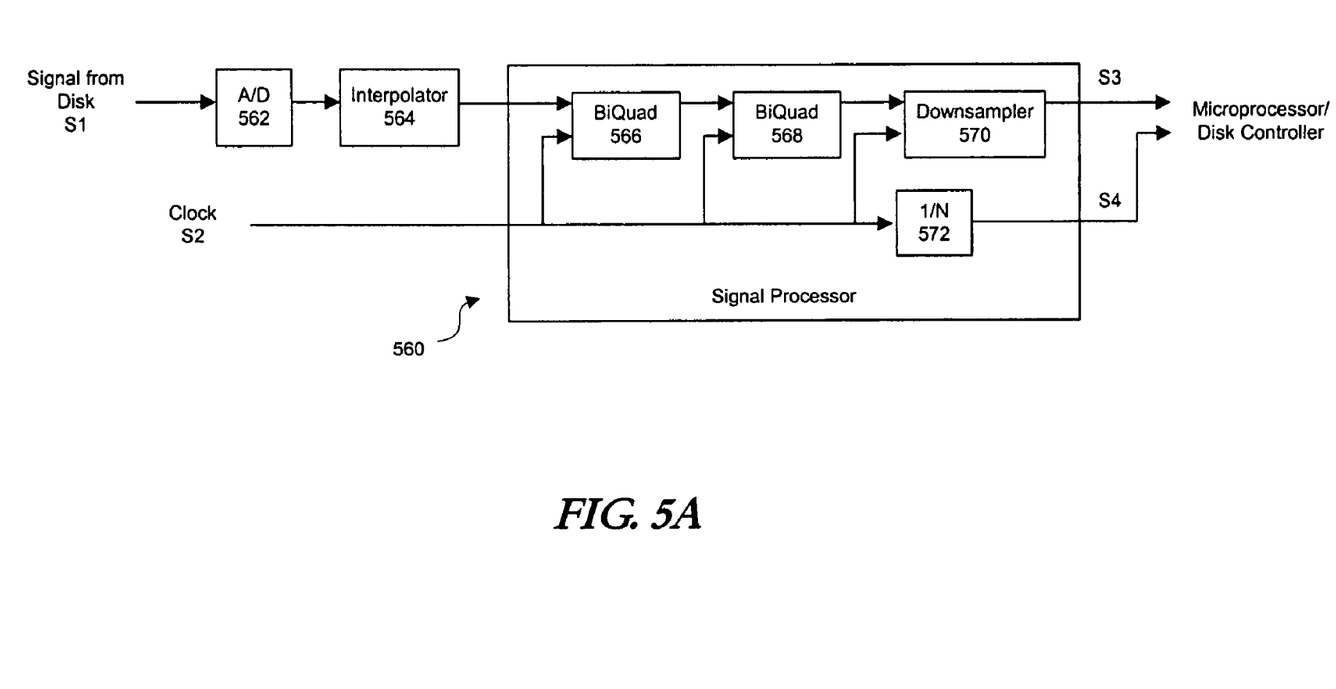
FIG. 5A is a schematic of an embodiment of a circuit for use with systems and methods of the present invention for processing an analog signal from an R/W head.

FIG. 5A is a schematic of an embodiment of a circuit 550 for use with systems and methods of the present invention to achieve down-sampling of a signal, as described above. Such a circuit resembles circuits as described, for example, in U.S. Pat. No. 6,738,205, issued to Moran et al., incorporated herein by reference; however, a circuit as described in FIG. 5A can be applied for improved down-sampling over previous circuits. To demodulate burst information for self-servo writing (and for normal user operations), the incoming analog signal S1 read by the RAN head as the R/W head passes over the reference pattern is digitized by the A/D 562. As above, where the frequency of the pattern changes, the digitized signal can be converted to a desired frequency by interpolation (either by up-sampling or down-sampling), the interpolation being executed by an interpolator circuit 564. A signal processor 560 receives the interpolated signal from the interpolator circuit 564 and a clock signal S2. The signal processor 560 includes two bi-quad filters 566,568, serially arranged, each bi-quad filter 566,568 comprising a fairly steep low-pass filter. The signal processor 560 also includes a down-sampler circuit 570 and a clock divider 572. The two signals are fed to the two bi-quad filters 566,568 and the high-frequency components of the digitized signal are attenuated. The processed signal is passed from the bi-quad filters 566,568 to the down-sampler circuit 570 for generating synchronous samples S3 representing the analog signal of the reference pattern as read by the RAN head. The down-sample rate N can have a range of values, as described in Moran '205. The clock signal S2 is divided by the down-sample rate N to obtain a down-sample clock signal S4 which is sent, for example, to the microprocessor 120 and/or disk controller 128. Likewise, the synchronous samples S3 are sent to the microprocessor 120 and/or disk controller 128 or other circuitry in the channel.

Figure 5B:
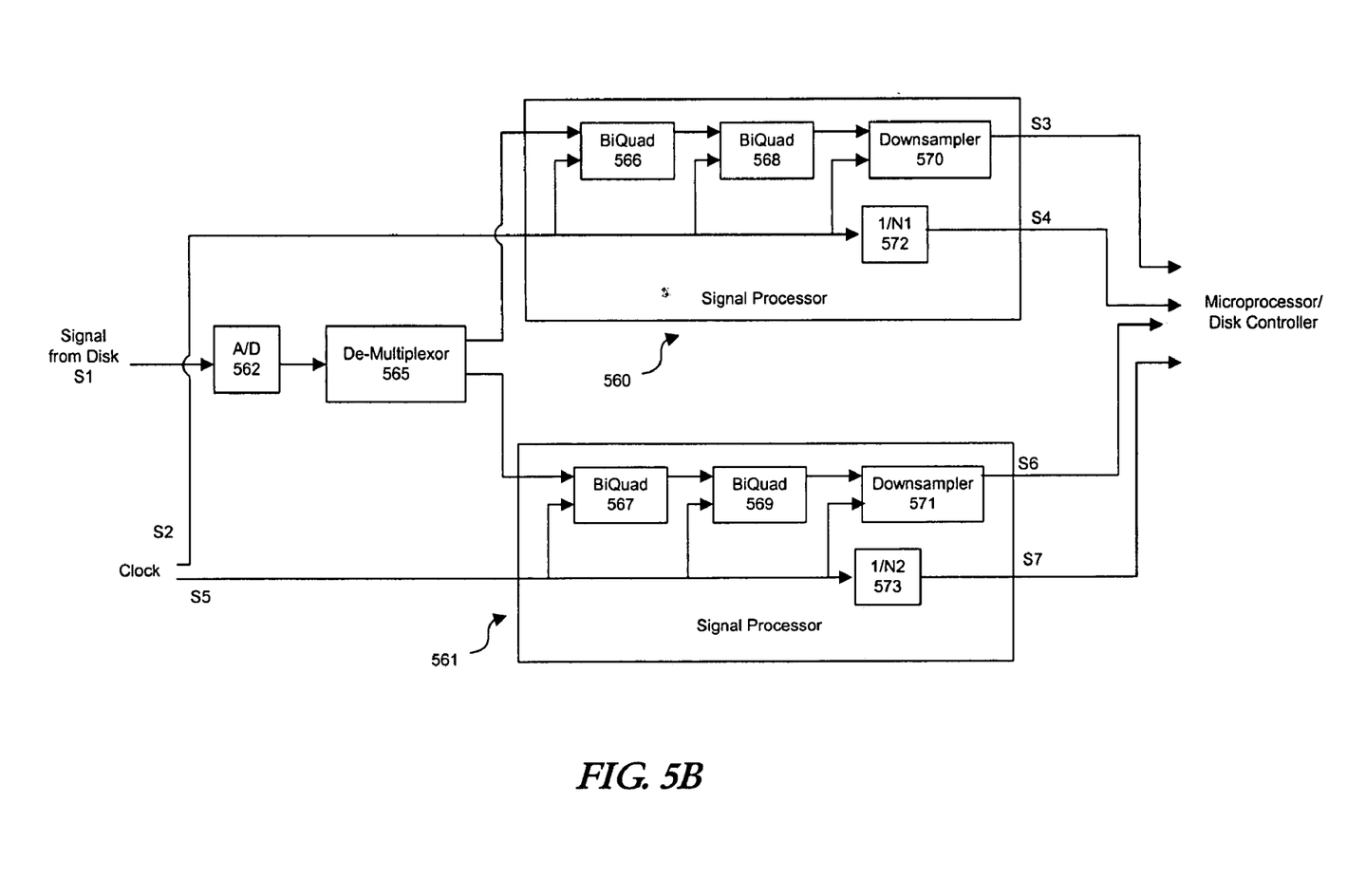
FIG. 5B is a schematic of an alternative embodiment of a circuit for use with systems and methods of the present invention for processing an analog signal from an R/W head.

FIG. 5B is a schematic of an alternative embodiment of a circuit 552 for use with systems and methods of the present invention to achieve down-sampling of a signal. As in the previous embodiment, the incoming analog signal S1 read by the R/W head is digitized in the A/D 562. The digitized signal is passed to a de-multiplexor 565, rather than an interpolator circuit, and the de-multiplexor 565 passes the digitized signal to one of two signal processors 560,561. The reference pattern in such an embodiment can comprise two portions, each having a different frequency. Where the digitized signal is obtained from a first portion of the pattern having a first frequency, the digitized signal can be passed to a first signal processor 560. The first signal processor 560 includes a pair of bi-quad filters 566,568. The processed signal is passed from the bi-quad filters 566,568 to a first down-sampler 570 for generating first synchronous samples S3 representing the analog signal of the first portion of the reference pattern. Where the digitized signal is obtained from a second portion of the reference pattern having a second frequency, the digitized signal can be passed to a second signal processor 561. The second signal processor 561 likewise includes a pair of bi-quad filters 567,569. The processed signal is passed from the bi-quad filters 567,569 to a second down-sampler 571 for generating second synchronous samples S6 representing the analog signal of the second portion of the reference pattern. The first down-sampler 570 can down-sample at a first rate N1 and the second down-sampler 571 can down-sample at a second rate N2. The first and second down-sample rates N1,N2 can compensate for a difference in frequency of the first and second portions of the reference pattern, thereby sending substantially the same number of synchronous samples to the microprocessor 120 and/or disk controller 128. Likewise, the clock signals S2,S5 are divided by circuitry 572,573 at the respective down-sample rates N1,N2 to obtain a down-sample clock signal S4,S7 which is sent, for example, to the microprocessor 120 and/or disk controller 128.

In other embodiments, a circuit for use with systems and methods of the present invention to achieve down-sampling of a signal can include more, fewer or different components than those shown above in FIGS. 5A and 5B. One of ordinary skill in the art will appreciate the myriad different configurations with which a pattern having portions sampled at different frequencies can produce synchronous samples for use by a microprocessor and/or disk controller. Embodiments of circuits in accordance with the present invention are meant to include all such configurations.

Signal processing techniques can be further be applied, for example, on an alternative reference pattern wherein chevrons near the ID are a lower frequency than digital information preceding the chevrons. Such a reference pattern can be useful, for example, where it is desired that the digital information be printed having a minimum feature size. An angle of a chevron requires that the chevron have a smaller feature width than a width of digital information preceding the chevron so that the width encountered by the R/W head—the product of the circumferential extent of a chevron transition-pair and the cosine of the chevron angle—is equivalent to the feature width of the digital information. Thus, the chevron limits the feature width of the digital information. However, if the chevron is printed (or servo written) at a lower frequency and down-sampled (or the digital information is up-sampled), the digital information can be printed (or servo written) having the minimum feature width. Optionally, the chevron pattern can be printed or servo written at the higher frequency at some position along the stroke where the feature width is no longer a limiting factor.

Reference patterns can include higher frequency bursts that occupy no more space than previously occupied by the lower frequency bursts, but that allow more burst cycles in each wedge. Such an implementation can have the advantage of using a higher frequency signal (with a resulting lower position error signal (PES) noise), but can suffer a problem such as having a radial location where the burst frequency suddenly changes. Such a problem can be dealt with in any of a number of ways. In a first approach to dealing with such a problem, the drive system can simply deal with the fact that demodulation of the signal when the head straddles the two regions (of high frequency and low frequency bursts) may not be acceptable, or may be otherwise less than optimal. The drive system can keep careful track of the location of that region, and have the servo expect "bad" burst-demodulation there. Since the eccentricity of the disk can be as much as 100 microns or so, only two samples of a track may have the possibility of placing the head in such a "straddle" position. This can be due to the printed-media pattern moving in and out sinusoidally at the spin-speed, with the R/W head being held at a relatively constant radius to servowrite final wedges on a drive. If the decision is made to "spare-out" (i.e., mark as unusable) all of the affected tracks, it would represent about 400 data-tracks (at 100 KTPI, or 100000 tracks-per-inch; a typical track-density for drives in the near future). That might be 1% or so of the tracks in a 2.5-inch disk drive. That would be a high, but not unacceptable, penalty.

Figure 6:
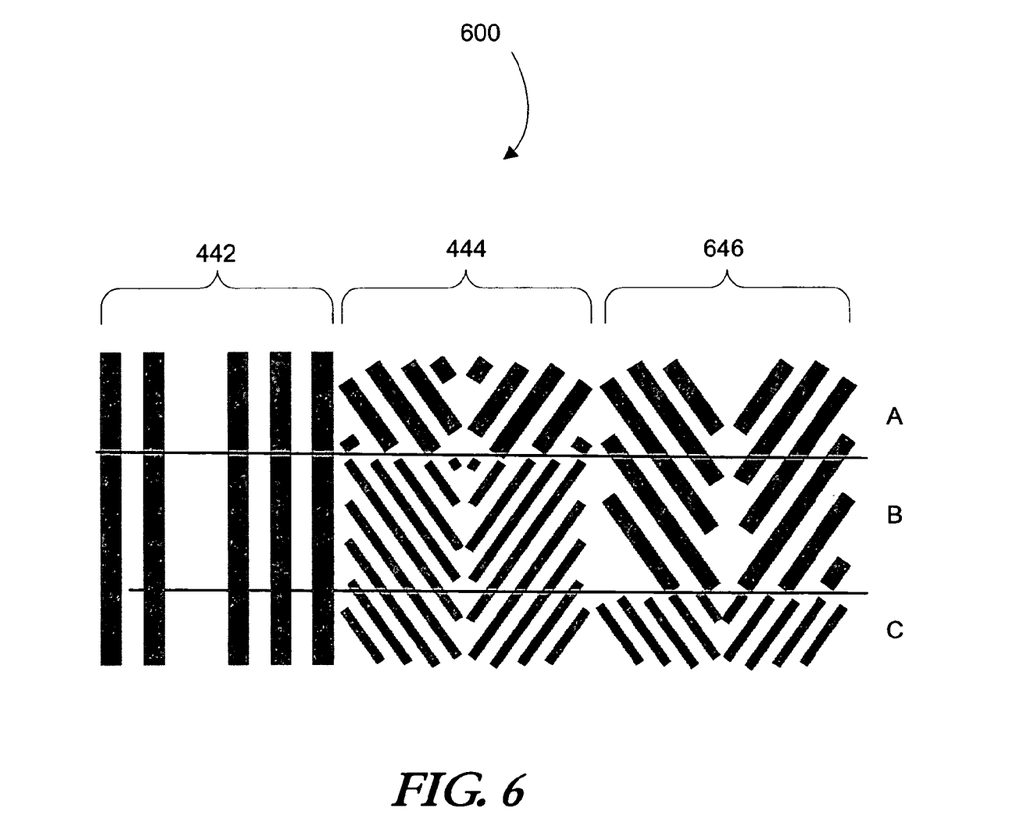
FIG. 6 illustrates a portion of a reference pattern having two sets of burst-regions with variable frequency chevrons in accordance with an alternative embodiment of the present invention.

In an alternative approach, two sets of burst-regions can be used for every wedge, a portion 600 of which is shown in FIG. 6. Near the ID (region A), both sets 444,646 can be low-frequency. Near the OD (region C), both sets 444,646 can be high frequency. In a middle, transition region B, which can be relatively narrow—such as on the order of, or slightly wider than, the maximum eccentricity of 100 microns—one set can contain low-frequency bursts and the other can contain high-frequency bursts. In the transition region B, either the low-frequency or the high-frequency bursts can be used. If writing is started at the OD, the high-frequency bursts (in both sets 444,646) can be used from the OD until near (but before) the start of the transition-region B. There, the drive system can switch to using the high-frequency bursts 444, or one of the two sets. Near (but before) the end of the transition region B, the drive can switch to using low-frequency bursts 646, or one of the two sets. Finally, once the head is "comfortably" beyond the transition region B, the drive system can use low-frequency bursts in both sets 444,646. It would be possible to suffer degraded PES noise, and thus degraded tracking, wherever only one set of bursts is being used. If the quality of the resulting signal is sufficiently poor, the drive system can "spare out" the affected tracks, as was possible for the first approach above. It may be more beneficial, however, to compensate for degraded PES noise using techniques such as multi-pass servowriting, additional WORF revolutions and/or conditional-servowriting. In multi-pass servowriting, additional passes allow patterns such as servo burst pairs to be written and/or trimmed on separate passes. The additional passes reduce the written runout, as the average misplacement decreases when the number of passes increases. Each burst in a servo pattern can also be written and/or trimmed in multiple passes. As PES noise degrades, more time can be spent burst trimming/writing, or in collection of WORF data. In conditional-servowriting, extra revolutions can be used to allow writing of servo digital and/or burst data only when the demodulated PES is within certain limits. Any subset of these techniques (or all of them) might be used to trade a higher time-penalty (in terms of revolutions spent per servo track written) for a written-in runout that is similar to that achieved over the rest of the drive's stroke, even though the PES noise is degraded, relative to what could be obtained with all of the bursts. In any case, the overall time penalty would likely be relatively small, since the transition region would occupy only a very small fraction of the entire stroke of the device.

The example described herein uses two burst frequencies, with a factor of ⅔ difference in the frequencies. It should be understood that the invention can be extended to any number of different frequencies, such as may increase roughly in proportion with increasing radius of the disk, at the possible cost of more complexity in the "up-sampling" or "down-sampling" circuitry necessary, and in issues related to dealing with switches between frequencies. For example, where the frequency is doubled, a simplified interpolation scheme is required, or where the frequency is quintupled for every three samples, a more complicated interpolation scheme is required. At any one boundary between burst-frequencies, though, the servo can only be required to deal with two frequencies, namely the two on either side of the boundary. Further, the particular method of up-sampling and/or down-sampling the signal (using linear interpolation) is not the only possible method, as is apparent to one of skill in the art.

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the relevant arts. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalence.

We claim:

1. A rotatable disk for use in a data storage device, the rotatable disk comprising:
   an inner diameter;
   an outer diameter;
   a servo wedge disposed between the inner diameter and the outer diameter, the servo wedge including:
      a first end,
      a second end,
      a preamble field extending from the first end to the second end; and
      a servo-burst field extending from the first end to the second end and having a set of servo-bursts forming a chevron angle relative to the preamble field;
   wherein a burst-frequency of the set of servo-bursts varies between the first end and the second end.

2. The rotatable disk of claim 1, wherein:
   the set of servo-bursts is a first set of servo-bursts;
   the servo-burst field further includes a second set of servo-bursts; and
   a burst-frequency of one or both of the first and second sets of servo-bursts varies between the first end and the second end.

3. The rotatable disk of claim 2, wherein:
the burst-frequency of the first and second sets of servo-bursts between the first end and a transition region is a first frequency;
the burst-frequency of the first and second sets of servo-bursts between the transition region and the second end is a second frequency;
the transition region is between the first end and the second end; and
the transition region includes one of the first and second sets of servo-bursts at the first frequency, and the other of the first and second sets of servo-bursts at the second frequency.

4. The rotatable disk of claim 3, wherein the second frequency is higher than the first frequency.

5. The rotatable disk of claim 3, wherein the burst-frequency of digital information within the preamble field is the first frequency.

6. The rotatable disk of claim 2, further comprising:
a transition region between the first end and the second end;
wherein:
between the first end and the transition region, the burst-frequency one of the first and second sets of servo-bursts is a first frequency and the burst-frequency of the other of the first and second sets of servo-bursts is a second frequency;
between the transition region and the second end, the burst-frequency one of the first and second sets of servo-bursts is a first frequency and the burst-frequency of the other of the first and second sets of servo-bursts is a second frequency;
the transition region includes both of the first and second sets of servo-bursts at one of the first frequency the second frequency.

7. The rotatable disk of claim 1, wherein a frequency across the preamble field is substantially the same from the first end to the second end.

8. A system to self-servo write one or more disks in a hard disk drive, the system comprising:
a housing;
a spindle rotatably connected with the housing;
a reference disk associated with the spindle and including an inner diameter, an outer diameter, and a servo wedge disposed between the inner diameter and the outer diameter having:
a first end,
a second end,
a preamble field extending from the first end to the second end;
a servo-burst field extending from the first end to the second end and having a set of servo-bursts forming a chevron angle relative to the preamble field,
wherein a burst-frequency of the set of servo-bursts varies between the first end and the second end
a read/write head adapted to communicate with the reference disk; and
a circuit to convert a signal of the servo wedge read by the read/write head so that the signal does not vary between the first end and the second end.

9. The system of claim 8, wherein:
the set of servo-bursts is a first set of servo-bursts;
the servo-burst field further includes a second set of servo-bursts; and
a burst-frequency of one or both of the first and second sets of servo-bursts varies between the first end and the second end.

10. The system of claim 9, wherein:
the burst-frequency of the first and second sets of servo-bursts between the first end and a transition region is a first frequency;
the burst-frequency of the first and second sets of servo-bursts between the transition region and the second end is a second frequency; and
the transition region is between the first end and the second end; and
the transition region includes one of the first and second sets of servo-bursts at the first frequency, and the other of the first and second sets of servo-bursts at the second frequency.

11. The system of claim 10, wherein the frequency of digital information within the preamble field is the first frequency.

12. The system of claim 10, wherein the transition region includes one of the first and second sets of servo-bursts at the first frequency, and the other of the first and second sets of servo-bursts at the second frequency.

13. The system of claim 10, wherein the second frequency is higher than the first frequency.

14. The system of claim 8, wherein the circuit comprises:
an interpolator circuit;
one or more filters; and
a down sampler.

15. The system of claim 14, wherein the one or more filters is a low-pass bi-quad filter.

16. The system of claim 8, wherein the circuit comprises:
a de-multiplexor;
a first signal processor including one or more filters and a downsampler; and
a second signal processor including one or more filter and a downsampler;
wherein the first signal processor processes at a first frequency; and
wherein the second signal processor processes at a second frequency.

17. The system of claim 16, wherein the one or more filters is a low-pass bi-quad filter.

18. The system of claim 8, wherein a frequency across the preamble field is substantially the same from the first end to the second end.

19. A method to determine a position of a head over a disk having an inner diameter and an outer diameter in a hard disk drive, the method comprising:
providing a reference pattern disposed between the inner diameter and the outer diameter, the reference pattern including a first end, a second end, and a servo wedge extending from the first end to the second end having a preamble field including digital information arranged circumferentially across the preamble field at a first frequency, and a servo-burst field including a set of servo-bursts arranged across the servo-burst field circumferentially at the first frequency from the first end to a transition region of the disk and arranged at a second frequency from a transition region to the second end;
rotating the disk;
positioning the head over the reference pattern;
sampling the digital information from the preamble field with the head;
obtaining a preamble signal from the digital information samples from the preamble field;
filtering the preamble signal;
sampling the set of servo-bursts of the servo-burst field with the head;

obtaining a servo-burst signal based on the first set of servo-burst samples from the servo-burst field;

wherein:

when the head is positioned between the first end and the transition region, the servo-burst signal is the set of servo-burst samples; and when the head is positioned between the transition region and the outer second end, the servo-burst signal is obtained by:

converting the set of servo-burst samples from the second frequency to a third frequency, filtering the servo-burst samples, and converting the filtered set of servo-burst samples from the third frequency to the first frequency; and filtering the servo-burst signal.

* * * * *

UNITED STATES PATENT AND TRADEMARK OFFICE
CERTIFICATE OF CORRECTION

PATENT NO.         : 7,206,148 B2                                        Page 1 of 1
APPLICATION NO. : 11/081346
DATED              : April 17, 2007
INVENTOR(S)       : Richard M. Ehrlich It is certified that error appears in the above-identified patent and that said Letters Patent is hereby corrected as shown below:

Column 9, line 46: After "read by the", delete "RAN head" and insert --R/W head--.

Column 9, line 63: After "read by the", delete "RAN head." and insert --R/W head.--.

Column 10, line 66: Delete "(or servo written)", and insert --(or servowritten)--.

Column 11, line 1: After "can be printed", delete "(or servo written)", and insert --(or servowritten)--.

Column 11, line 3: After "printed or", delete "servo written", and insert --servowritten--.

Signed and Sealed this

Seventh Day of August, 2007

JON W. DUDAS
*Director of the United States Patent and Trademark Office*